(12) United States Patent
Bernitsas et al.

(10) Patent No.: US 10,228,479 B2
(45) Date of Patent: Mar. 12, 2019

(54) DYNAMIC GAIN ADJUSTMENTS IN SEISMIC SURVEYS

(71) Applicant: ION Geophysical Corporation, Houston, TX (US)

(72) Inventors: Nikolaos Bernitsas, Sugarland, TX (US); Carlos Calderon, Houston, TX (US); David Ridyard, Sugarland, TX (US); David Brookes, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 15/441,657

(22) Filed: Feb. 24, 2017

(65) Prior Publication Data

US 2017/0248720 A1  Aug. 31, 2017

Related U.S. Application Data

(60) Provisional application No. 62/300,446, filed on Feb. 26, 2016.

(51) Int. Cl.
*G01V 1/36* (2006.01)
*G01V 1/38* (2006.01)

(52) U.S. Cl.
CPC ............... *G01V 1/362* (2013.01); *G01V 1/38* (2013.01); *G01V 1/3808* (2013.01); *G01V 1/3835* (2013.01); *G01V 2210/1423* (2013.01); *G01V 2210/56* (2013.01)

(58) Field of Classification Search
CPC .. G01V 1/362; G01V 1/3808; G01V 2210/56; G01V 1/38; G01V 1/3835; G01V 2210/1423

USPC .......................................................... 367/24
See application file for complete search history.

(56) References Cited

U.S. PATENT DOCUMENTS

| | | | |
|---|---|---|---|
| 4,201,972 A | 5/1980 | Edwards et al. | |
| 4,486,865 A | 12/1984 | Ruehle | |
| 4,827,456 A | 5/1989 | Brac | |
| 5,835,451 A | 11/1998 | Soubaras | |
| 2010/0290312 A1 | 11/2010 | Domnanish et al. | |
| 2012/0195163 A1 | 8/2012 | Groenaas et al. | |

(Continued)

FOREIGN PATENT DOCUMENTS

| | | |
|---|---|---|
| GB | 1359719 | 7/1974 |
| NZ | 244530 A | 2/1996 |
| WO | 2015145260 A2 | 10/2015 |

OTHER PUBLICATIONS

International Search Report for International Application No. PCT/US2017/019661 dated Jun. 19, 2017 from European Patent Office.

*Primary Examiner* — Daniel L Murphy

(57) ABSTRACT

Embodiments of dynamic gain adjustments in seismic surveys are described. One method of acquiring a seismic survey includes determining an arrival time at a seismic receiver of a downgoing seismic wavefield associated with a seismic source based at least in part on an estimated position of the seismic source, an estimated position of the seismic receiver, or combinations thereof. The method also includes adjusting a gain of the seismic receiver based at least in part on the determined arrival time of the downgoing seismic wavefield in order to, for example, help prevent overdriving or clipping of the seismic receiver when the downgoing seismic wavefield arrives at or passes by the seismic receiver.

42 Claims, 15 Drawing Sheets

(56) References Cited

U.S. PATENT DOCUMENTS

2014/0043936 A1  2/2014  Poole
2015/0016218 A1  1/2015  Welker et al.

DYNAMIC GAIN ADJUSTMENTS IN SEISMIC SURVEYS

CROSS REFERENCES

The present Application for Patent claims priority to U.S. Provisional Patent Application No. 62/300,446 by BERNITSAS, entitled "DYNAMIC GAIN ADJUSTMENTS IN SEISMIC SURVEYS," filed Feb. 26, 2016, assigned to the assignee hereof and herein incorporated by reference in its entirety.

BACKGROUND

The present disclosure generally relates to seismic data acquisition and processing, and more particularly to dynamic gain adjustments in seismic surveys.

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include emitting seismic energy into the Earth with a seismic energy source (e.g., dynamite, air guns, vibrators, etc.), and monitoring the Earth's response to the seismic source with one or more receivers in order to create an image of the subsurface of the Earth.

Certain types of marine seismic surveys involve placing a receiver on a seafloor or towing one or more streamer cables with a plurality of receivers behind an acquisition vessel along pre-plotted sail lines. Each receiver includes, for example, a pressure sensor, a particle motion sensor, or both a pressure sensor and a particle motion sensor in proximity to one another. The pressure sensor may be, for example, a hydrophone that records scalar pressure measurements of a seismic wavefield. The particle motion sensor may be, for example, a three-component geophone or accelerometer that records vectorial velocity measurements of the seismic wavefield. By observing the reflected seismic wavefield detected by the receivers during the survey, the geophysical data pertaining to reflected signals may be acquired and these signals may be used to form an image of the Earth near the survey location. Also, similar seismic surveys can be performed on land, although a pressure sensor is typically omitted for land-based seismic surveys.

During the course of a marine seismic survey, the gain of the seismic receivers is conventionally set relatively high in order to adequately sample the relatively weak amplitude of the reflected seismic wavefields (as compared with the directly propagating seismic wavefield). As such, the seismic receivers may be overdriven by the arrival of the directly propagating seismic wavefield.

DETAILED DESCRIPTION

Described herein are methods and systems for dynamic gain adjustments in seismic surveys. As described in more detail below, the gain of each seismic receiver may be dynamically adjusted in real-time based on, for example, the position of a seismic source at the time when it emits seismic energy and the position of the seismic receiver when it receives the emitted energy in order to prevent the seismic receiver from being overdriven by downgoing seismic wavefields, such as the directly propagating seismic energy emitted by the seismic source. The positions of the seismic receiver and the seismic source may be determined in one of several different manners, including using known positions (e.g., obtained by GPS signals), estimating positions (e.g., using speed and heading information associated with the vessels towing the seismic source and the seismic receiver), and so forth.

In one embodiment, where seismic receivers are located in either towed streamers or on a seafloor, the gain of the seismic receiver is adjusted downward for a period of time corresponding with the arrival of the downgoing seismic wavefield (e.g., the directly propagating seismic energy emitted by the seismic source) so that the seismic receiver can obtain one or more measurements of the downgoing seismic wavefield without clipping, and is adjusted upward following the passage of the downgoing seismic wavefield so that the seismic receiver can detect subsequent seismic wavefields that are much lower in amplitude than the downgoing seismic wavefield. The gain may additionally or alternatively be adjusted based on seismic receiver proximity to the seismic source. Preset variable or constant gains may also be used in scenarios where proximity to the seismic source is known and/or constant. During or following completion of the seismic survey, the seismic traces may be processed in order to extract a source signature associated with the seismic source based on the downgoing seismic wavefield recorded by the seismic receiver, and/or may be processed to extract reflection data from time samples recorded during or following the arrival of the downgoing seismic wavefield.

Figure 1A:
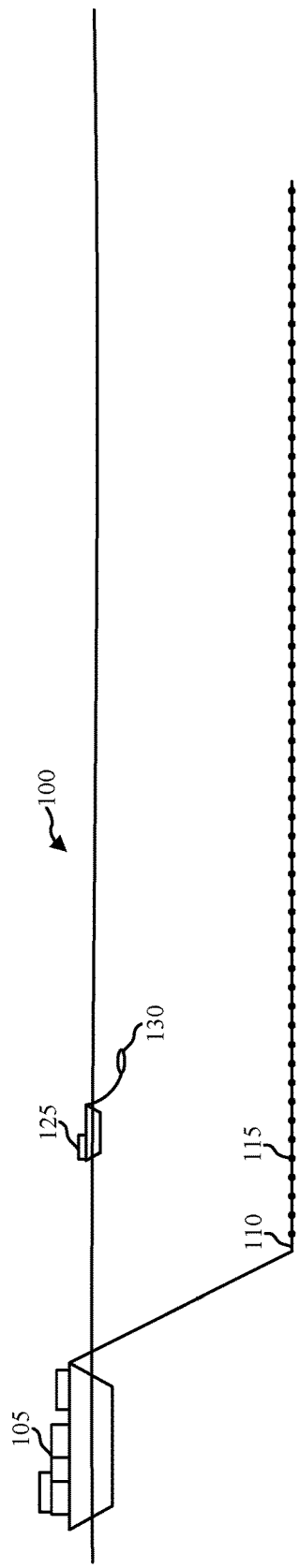
FIGS. 1A-1E are diagrams illustrating examples of a marine seismic data acquisition survey system in accordance with aspects of the present disclosure.
Figure 1B:
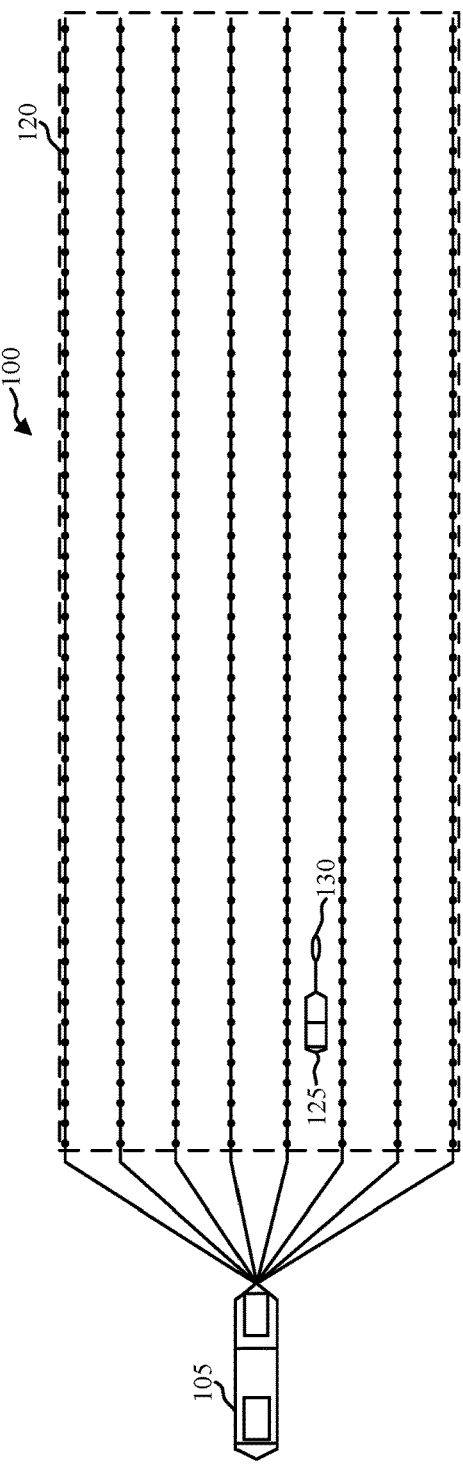

Turning now to the figures, FIGS. 1A and 1B are diagrams illustrating an example of a marine seismic data acquisition survey system 100 in accordance with aspects of the present disclosure. The system 100 includes an acquisition vessel 105 towing a plurality of streamers 110. Each of the streamers 110 includes a plurality of receivers 115, and each of the seismic receivers 115 includes one or more sensors, such as a pressure sensor and/or a particle motion sensor. The streamers 110 may in some embodiments be towed at a depth that is greater than in conventional towed streamer seismic surveys, for example 20-30 meters. In FIG. 1, an independent source vessel 125 tows one or more seismic sources 130, such as air guns, independently of the acquisition vessel 105 towing the seismic receivers 115, as described in more detail in United States Patent Application Publication No. 2015/0331127, entitled "Methods and Systems for Conducting Reconnaissance Marine Seismic Surveys," the entirety of which is hereby incorporated by reference for all purposes. By towing the independent source 130 above one or more of the towed streamers 110, the source 130 may be positioned over one or more receivers 115 of the streamers 110 in the vertical dimension of the water column. This configuration may allow for zero-offset and near-offset measurements to be made as the source 130 can be positioned directly over various receivers 115 at various points during the survey. Generally speaking, however, the principles described herein can be applied to receivers that are vertically displaced below and/or above the seismic source in any manner, and/or that are laterally displaced relative to the seismic source in any manner. In alternate embodiments of the present disclosure, for example, the acquisition vessel 105 may tow a seismic source in addition to or in place of the independent source vessel 125 towing the seismic source 130. Also, in some embodiments, a plurality of seismic sources may be towed, either by the acquisition vessel 105, or by respective independent source vessels. Seismic receivers 115 may also, in some embodiments, be stationary and be located on a seafloor.

As used herein, a seismic source may refer to a single impulsive seismic source (such as an air gun, a vibrator, an explosive such as dynamite, and so forth), or a group of single seismic sources (which may be referred to in the art as a source sub-array or a source array). Such seismic sources may emit seismic energy for a finite duration, and may do so repeatedly during a seismic survey. In those instances in which multiple discrete seismic sources are used, the individual seismic sources may be arranged in any manner, including in strings towed behind a vessel. They may be arranged symmetrically or asymmetrically, and may be towed at similar or different depths. Also, when a group of discrete seismic sources are used, they may be fired (e.g., caused to emit seismic energy) at the same time or at different times. Also, while the present disclosure primarily describes marine towed-streamer seismic surveys and thus focuses on seismic sources used in marine seismic surveys, the principles described herein may also be extended to other types of marine seismic surveys (including ocean-bottom cable and ocean-bottom node systems), or even to land-based seismic surveys and the seismic sources used in such land-based seismic surveys. Thus the use of a seismic source as described herein will be understood to include many different variations and configurations.

Returning to FIGS. 1A and 1B, as the acquisition vessel 105 traverses pre-plotted sail lines, the seismic source 130 may emit seismic energy at pre-determined intervals, and the seismic receivers 115 may sense reflections of the emitted seismic energy after the emitted energy reflects off of subsurface regions of interest. In this manner, primary seismic data is acquired at the streamers 110 towed by the acquisition vessel 105 based at least in part on energy emitted by the seismic source 130. Also, before the seismic energy reflects off of the subsurface, it may impinge the seismic receivers 115 on its way down to the subsurface as what is known as the directly propagating wavefield.

Figure 1C:
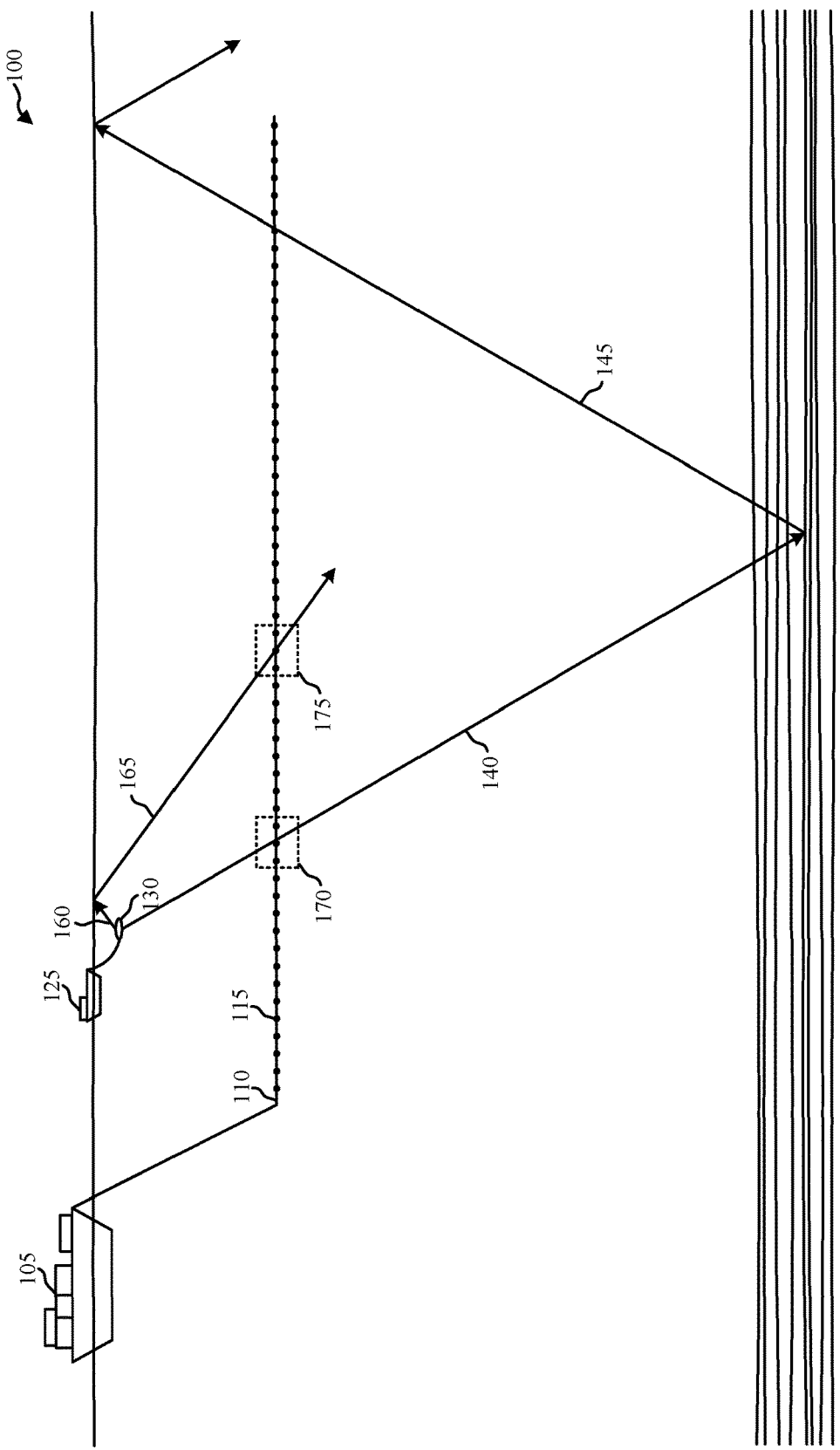

Referring for example to FIG. 1C, the seismic energy emitted by the seismic source 130 may include a directly propagating downgoing seismic wavefield 140 that arrives at the seismic receivers 115 in region 170 relatively soon following the activation of the seismic source 130. This directly propagating downgoing seismic wavefield 140 may reflect off of the ocean bottom and the subsurface and return as reflected seismic wavefield 145 at the seismic receivers 115 on the streamers 110. The amplitude of the reflected seismic wavefield 145 may be substantially lower than the amplitude of the directly propagating seismic wavefield 140—for example, the reflected seismic wavefield 140 may be 1-5% as strong as the directly propagating seismic wavefield 140. Referring still to FIG. 1C, the seismic energy emitted by the seismic source 130 may also travel upwards towards the surface of the water as shown by propagation arrow 160. Because the water-air interface is a very good reflector, most of this energy may be reflected by the water-air interface and return to the seismic receivers 115 as a source ghost 165 at region 175. Note that while FIG. 1C illustrates the various wavefields 140, 145, 160, 165 propagating as rays to facilitate the present description, it will be appreciated that the true propagation of such wavefields is more complex.

In some instances, downgoing seismic wavefields (such as the directly propagating wavefield 140 and/or the source ghost wavefield 165) may be quite large in amplitude, and as such may overdrive the seismic receivers 115 as they pass by. In these instances, the traces recorded by the seismic receivers 115 may be "clipped" at the maximum amplitude that the seismic receivers 115 can register. Such clipping may result in a loss of data for those time samples that clip. However, by adjusting the gain of the seismic receivers 115 as described herein, clipping may be reduced or altogether avoided so that valuable data can be extracted from the recorded traces corresponding to the arrival of a downgoing seismic wavefield. For example, by reducing or eliminating clipping, the source signature of the seismic source 130 may be determined by examining the samples of the downgoing seismic wavefields 140, 165, and/or reflection data (e.g., from previous source shots) may be extracted from what otherwise would be clipped and relatively useless data samples.

Figure 1D:
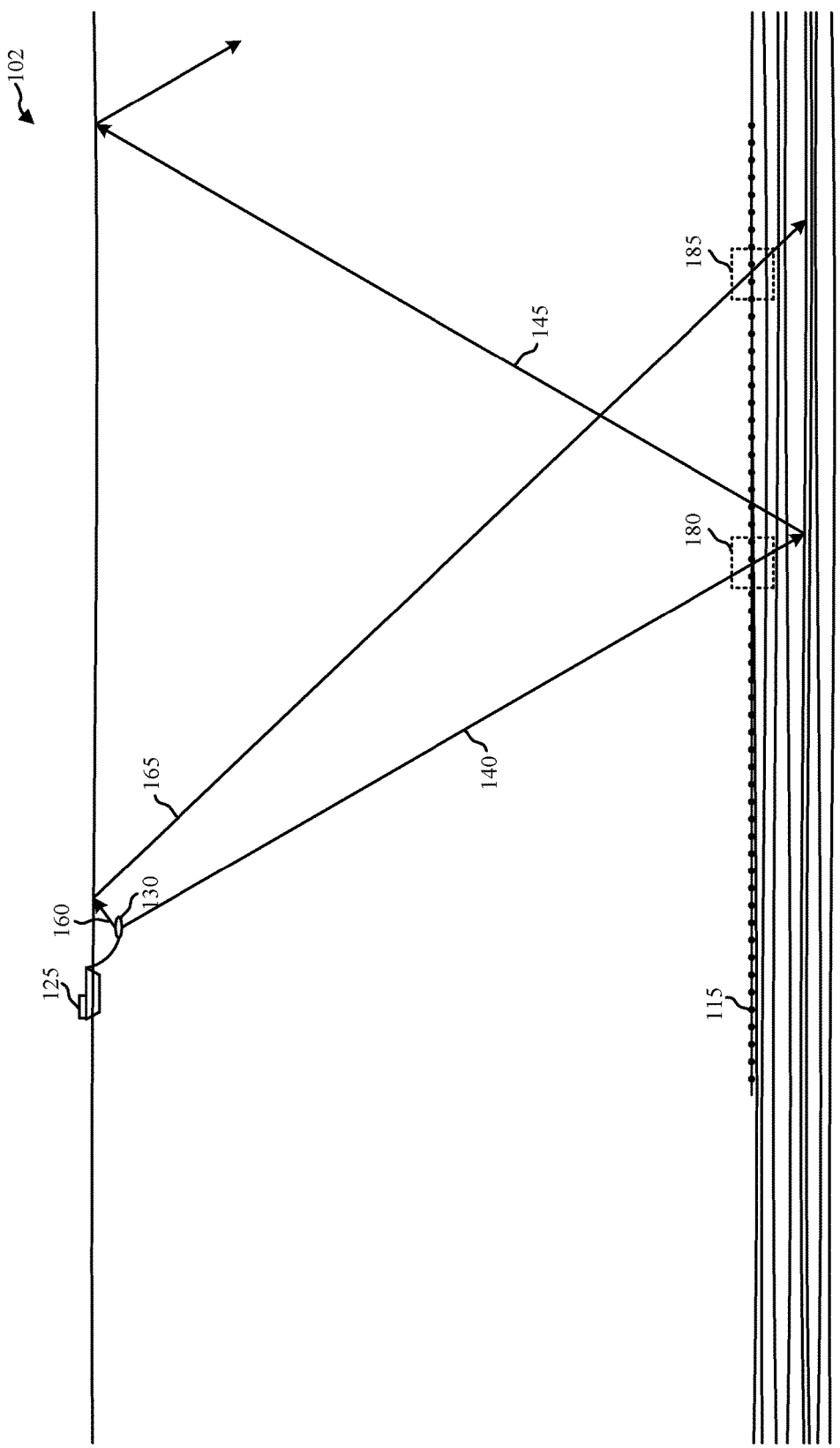

FIG. 1D illustrates an additional example of a system 102 where the seismic receivers 115 are located on a surface of a seafloor (either in an ocean-bottom cable or ocean-bottom node system). As in the towed streamer scenario, the seismic energy emitted by the seismic source 130 may include a directly propagating downgoing seismic wavefield 140 that arrives at the seismic receivers 115 in region 180 following the activation of the seismic source 130. This directly propagating downgoing seismic wavefield 140 may reflect off of various ocean bottom subsurfaces and return as reflected seismic wavefield 145 to the seismic receivers 115 located on the seafloor. As in the towed streamer scenario, the amplitude of the reflected seismic wavefield 145 may be substantially lower than the amplitude of the directly propagating seismic wavefield 140. Referring still to FIG. 1D, the seismic energy emitted by the seismic source 130 may also travel upwards towards the surface of the water as shown by propagation arrow 160, and may be reflected by the water-air interface and return to the seismic receivers 115 as a source ghost 165 at region 185. As in the system 100 of FIG. 1C, downgoing seismic wavefields (such as the directly propagating wavefield 140 and/or the source ghost wavefield 165) may be quite large in amplitude, and as such may overdrive the seismic receivers 115 as they pass by. In these instances, the traces recorded by the seismic receivers 115 may be "clipped" at the maximum amplitude that the seismic receivers 115 can register. Such clipping may result in a loss of data for those time samples that clip. However, by adjusting the gain of the seismic receivers 115 as described herein, clipping may be reduced or altogether avoided so that valuable data can be extracted from the recorded traces corresponding to the arrival of a downgoing seismic wavefield. For example, by reducing or eliminating clipping, the source signature of the seismic source 130 may be determined by examining the samples of the downgoing seismic wavefields 140, 165, and/or reflection data (e.g., from previous source shots) may be extracted from what otherwise would be clipped and relatively useless data samples.

Figure 1E:
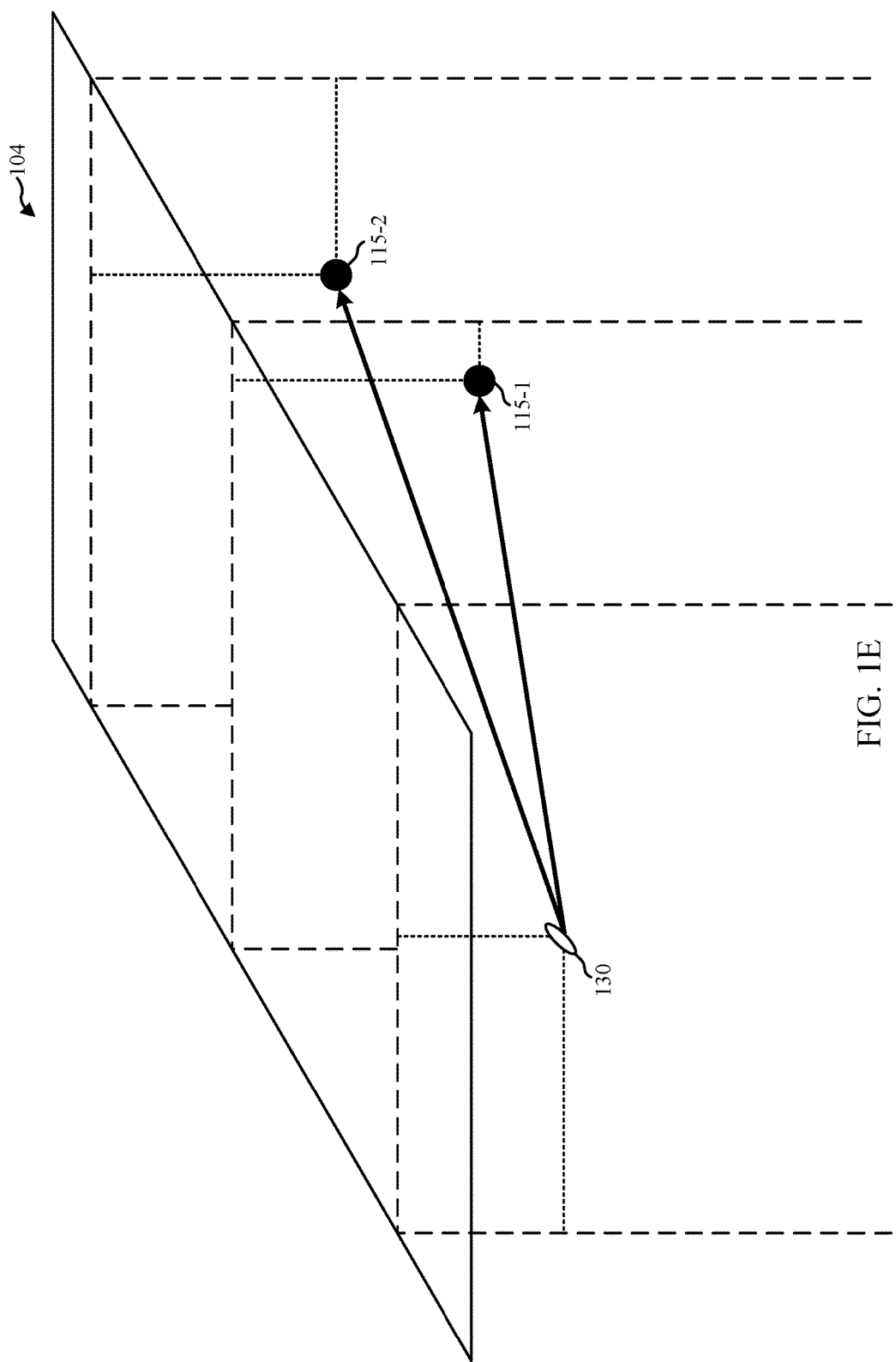

Referring now to FIG. 1E, a perspective view 104 of a portion of the systems 100, 102 from FIGS. 1A-1D is shown (with some elements of the systems 100, 102 omitted for clarity). As shown in FIG. 1E, the seismic energy emitted from the seismic source 130 may arrive at different seismic receivers 115-1, 115-2 at different arrival times (due to different distances between the seismic source and the different seismic receivers 115-1, 115-2) and/or at different arrival angles (due to different orientations and positions of the different seismic receivers 115-1, 115-2 relative to the seismic source 130. The arrival angle of each seismic receiver 115-1, 115-2 relative to the seismic source 130 may include several components, such as an azimuthal arrival angle from the inline axis of the seismic source 130 relative to the seismic receivers 115-1, 115-2, and a vertical arrival angle of the seismic source 130 relative to the seismic receivers 115-1, 115-2. As described below in more detail, the different distances, different orientations, and different positions of the seismic receivers 115-1, 115-2 relative to the seismic source 130 may impact both the arrival time and the amplitude of seismic energy emitted by the seismic source 130 at the seismic receivers 115-1, 115-2. Also, in those embodiments in which a source signature is extracted from the seismic data from a particular receiver 115, that source signature may be one component of a directionally varying source signature, with the one component characterized by these various arrival angles, among other things.

Figure 2:
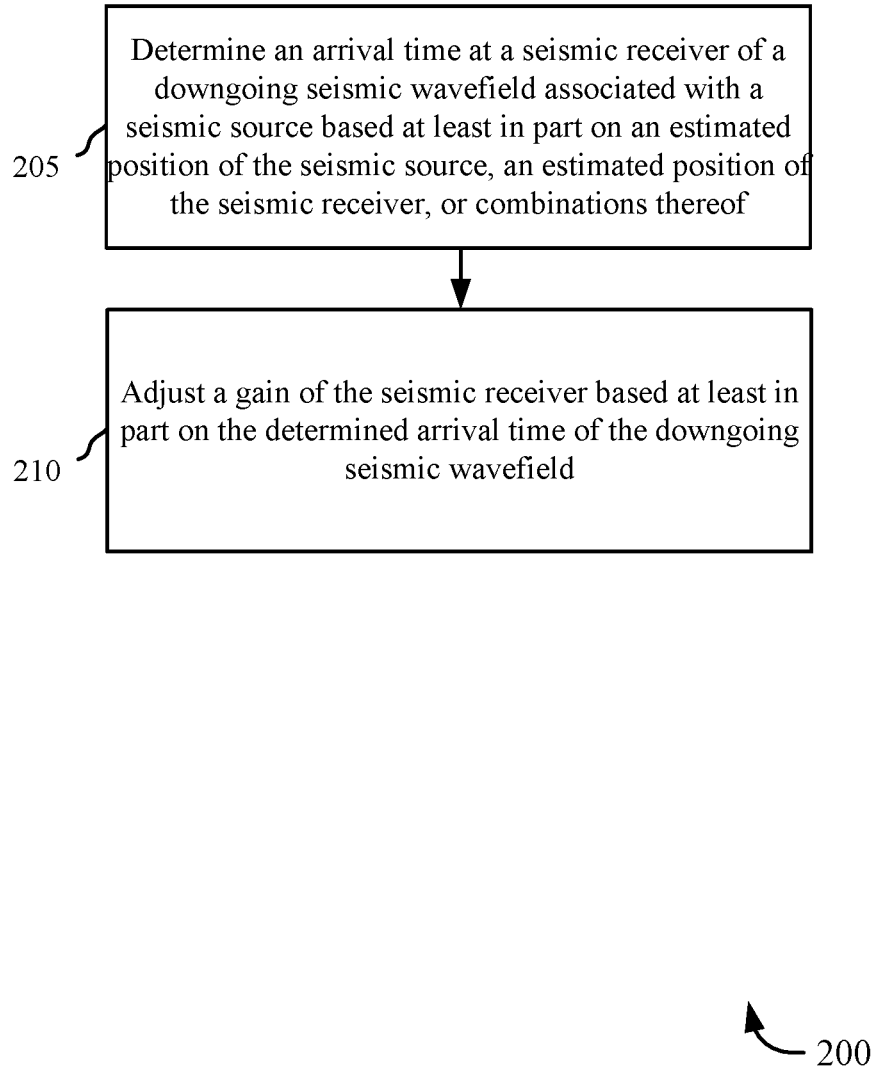
FIG. 2 is a flow chart illustrating an example of dynamically adjusting gain in a seismic survey in accordance with aspects of the present disclosure.

FIG. 2 is a flow chart illustrating an example method 200 of dynamically adjusting gain in a seismic survey in accordance with aspects of the present disclosure. The method 200 is described with reference to the seismic data acquisition systems 100, 102 shown in FIG. 1 and is more fully described with reference to the other figures herein. At block 205 of the method 200, an arrival time of a downgoing seismic wavefield at a seismic receiver 115 may be determined, where the downgoing seismic wavefield is associated with a seismic source 130 and may include, for example, the directly propagating, downgoing seismic wavefield 140 from the seismic source 130 and/or seismic energy referred to as the source ghost 165. The arrival time may be determined based at least in part on an estimated position of the seismic source 130 when it emits seismic energy or based at least in part on an estimated position of the seismic receiver 115 when the seismic energy emitted by the seismic source 130 arrives at and passes by the seismic receiver 115. At block 210 of the method 200, a gain of the seismic receiver may be adjusted based at least in part on the determined arrival time of the downgoing seismic wavefield. In embodiments with multiple seismic sources 130 and/or multiple seismic receivers 115, blocks 205 and 210 may be carried out for each of the different source-receiver pairs in order to adjust the gain of each seismic receiver 115 with respect to each shot fired from each seismic source 130.

Figure 3:
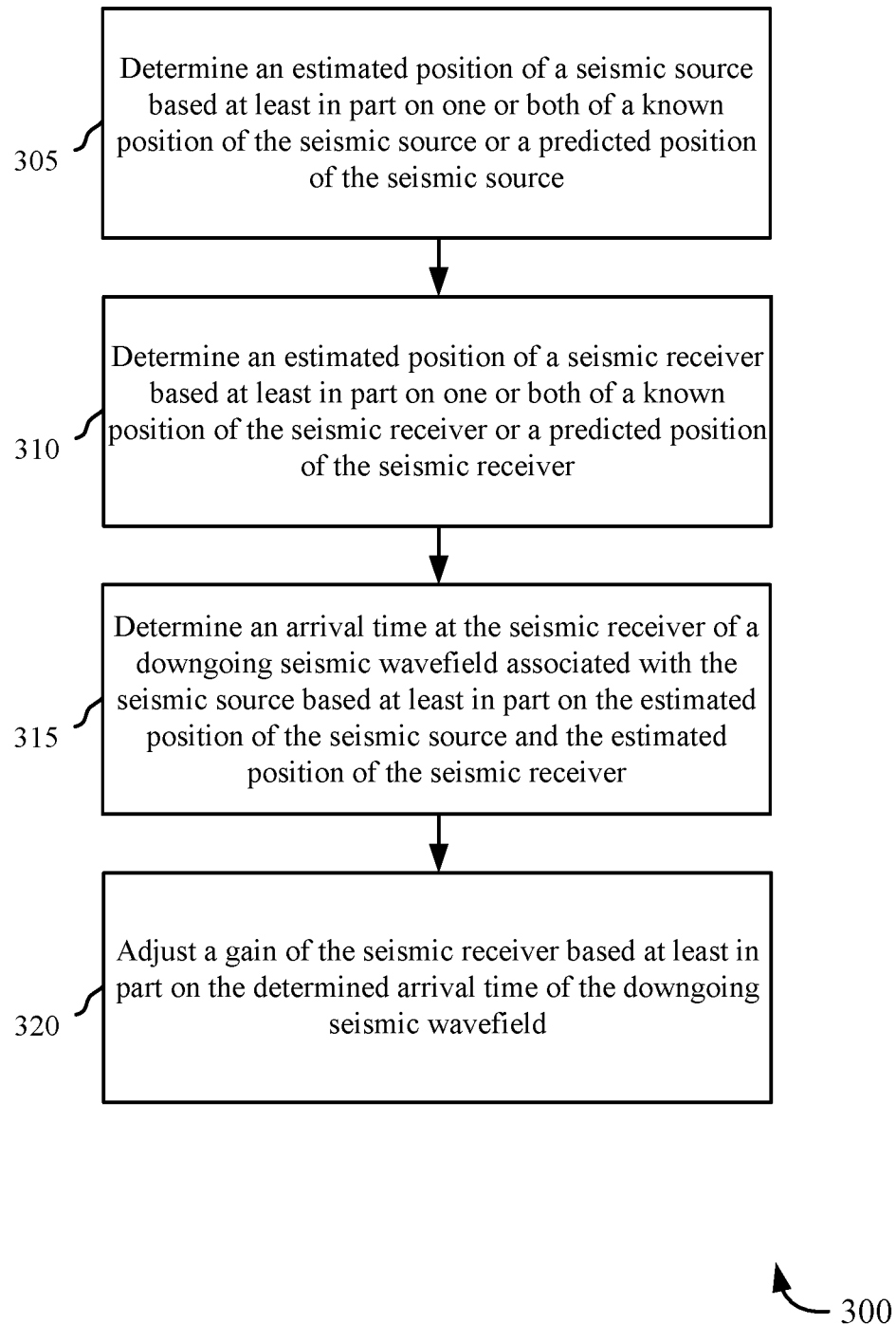
FIG. 3 is a flow chart illustrating another example of dynamically adjusting gain in a seismic survey in accordance with aspects of the present disclosure.

Turning now to FIG. 3, a flow chart illustrating another example method 300 of dynamically adjusting gain in a seismic survey is shown, in accordance with aspects of the present disclosure. The method 300 is described with reference to the seismic data acquisition systems 100, 102 shown in FIG. 1 and more fully described with reference to the other figures herein, and may be an example of one or more aspects of the method 200 described above with reference to FIG. 2. At block 305 of the method 300, an estimated position of a seismic source 130 is determined based at least in part on one or both of a known position of the seismic source 130 or a predicted position of the seismic source 130. The estimated position of the seismic source may include a three dimensional location and time at which the seismic source emits seismic energy. In other words, the position of the seismic source 130 that is of interest may be the position and time at which it emits seismic energy; the position of the seismic source 130 following the emission of seismic energy or shot may thus be irrelevant. The known position of the seismic source 130 may be obtained from, for example, global positioning system (GPS) measurements, acoustic pinger measurements, and so forth. The estimated position of the seismic source 130 may be derived from, for example, a speed and a direction of the vessel 125 towing the seismic source 130, optionally together with a known location of the vessel 125 (or seismic source 130) at a prior point in time. As an example, the speed and direction of the vessel 125 may be determined through audio measurements of sounds emanating from vessel 125 (e.g., engine sounds, etc.).

At block 310 of the method 300, an estimated position of a seismic receiver 115 is determined based at least in part on one or both of a known position of the seismic receiver 115 or a predicted position of the seismic receiver 115. The estimated position of the seismic receiver 115 may include a three dimensional location and the arrival time at which the seismic receiver 115 is anticipated to record measurements associated with the downgoing seismic wavefield. In other words, the position of the seismic receiver 115 that is of interest may be the position at which it is expected to sense the seismic energy emitted by the seismic source 130 as a downgoing seismic wavefield; the position of the seismic receiver 115 at the time the seismic source 130 emits the seismic energy may be irrelevant except as a way to determine a predicted location of the seismic receiver 115 at this later point in time. The known position of the seismic receiver 115 may be obtained from, for example, global positioning system (GPS) measurements, acoustic pinger measurements, and so forth. The estimated position of the seismic receiver 115 may be derived from, for example, a speed and a direction of the vessel 105 towing the seismic receiver 115, optionally together with a known location of the vessel 105 (or seismic receiver 115) at a prior point in time. For example, the location of the seismic receiver 115 at the moment when seismic energy is emitted from the seismic source 130 may be combined with knowledge of the speed and direction of the vessel 105 towing the seismic receiver 115 and the known propagation speed of acoustic signals in water in order to accurately predict the location of the seismic receiver 115 when it will sense the downgoing seismic wavefield.

At block 315 of the method 300, an arrival time at the seismic receiver 115 of a downgoing seismic wavefield associated with the seismic source 130 is determined based at least in part on the estimated position of the seismic source 130 and the estimated position of the seismic receiver 115, as described for example above with reference to block 205 of method 200 in FIG. 2. In a system where the seismic receivers 115 are located on the seafloor, the location of the seismic receiver 115 at the moment when seismic energy is emitted from the seismic source 130 may be combined with the known propagation speed of acoustic signals in water in order to accurately predict the arrival time of the downgoing seismic wavefield at the seismic receiver 115. At block 320 of the method 300, a gain of the seismic receiver 115 may be adjusted based at least in part on the determined arrival time of the downgoing seismic wavefield, as described for example above with reference to block 210 of method 200 in FIG. 2.

Figure 4:
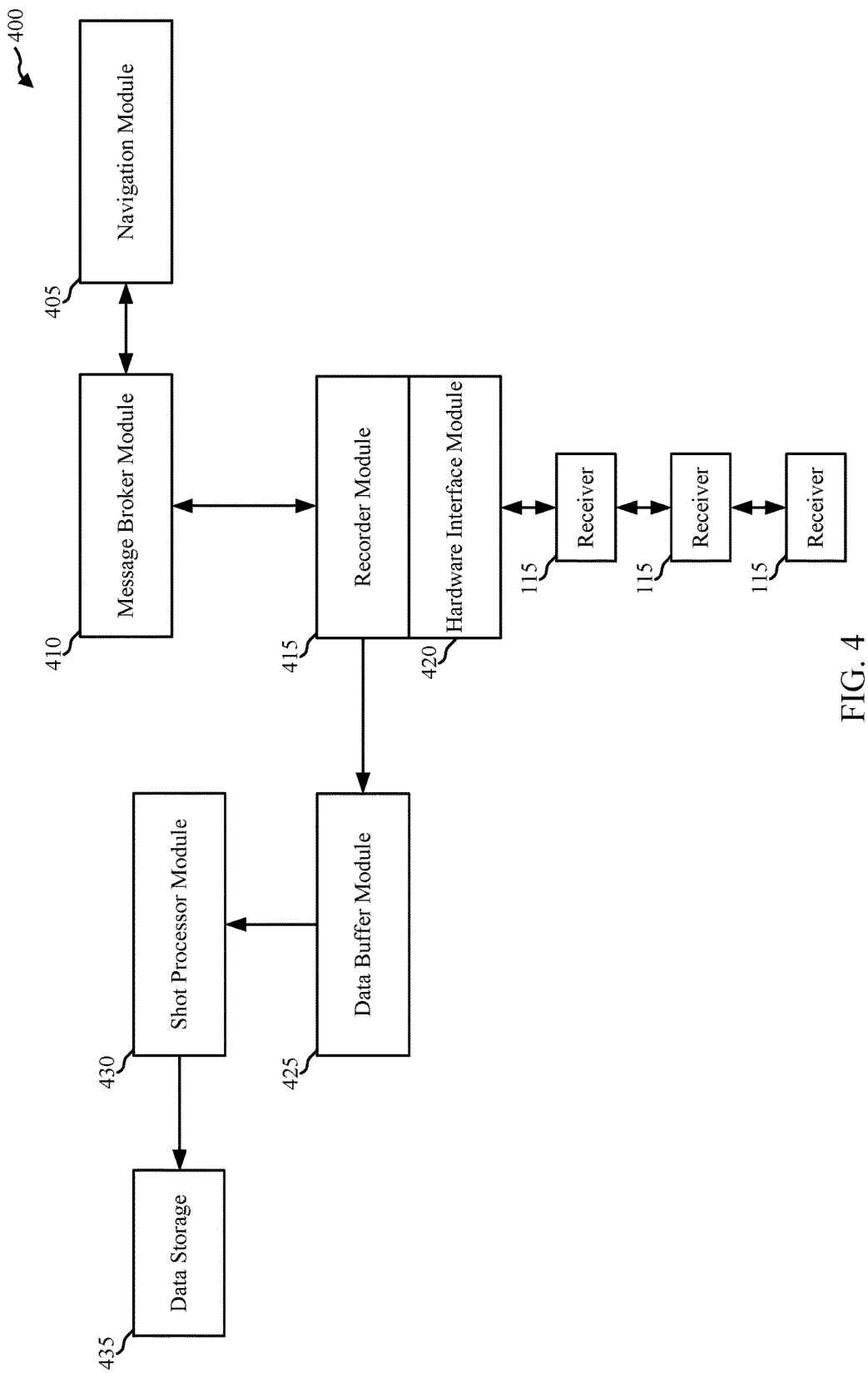
FIG. 4 is a diagram illustrating a system for dynamically adjusting gain in a seismic survey in accordance with aspects of the present disclosure.

FIG. 4 is a diagram illustrating a system 400 for dynamically adjusting gain in a seismic survey in accordance with aspects of the present disclosure. The system 400 illustrated in FIG. 4 may, for example, be included, in part, on the acquisition vessel 105 of the system 100 illustrated in FIG. 1. The system 400 may additionally allow for wired or wireless communication between components of the system 400, including with seismic receivers 115. The system 400 in FIG. 4 includes a navigation module 405, a message broker module 410, a recorder module 415, a hardware interface module 420, one or more receivers 115, a data buffer module 425, a shot processor module 430, and a data storage 435.

The navigation module 405 may be configured to provide estimated shot times for each shot of each seismic source 130 (e.g., times when each seismic source 130 emits seismic energy), and also to provide a known or estimated position of each seismic source 130. The navigation module 405 may provide this information to the message broker module 410 on a pre-shot basis (e.g., shortly before each shot is fired) so that the other components of the system 400 shown in FIG. 4 have sufficient time to process this information and ultimately adjust the gain of the seismic receivers 115 as described below. For example, the navigation module 405 may provide this information milliseconds to seconds in advance of each shot.

The message broker module 410 may be configured to receive the estimated shot times and known or estimated seismic source 130 positions from the navigation module and deliver such information to the recorder module 415. The recorder module 415 may be configured to receive the estimated shot times and the known or estimated seismic source 130 positions from the message broker module 410, and may further be configured to provide gain adjustment information to the hardware interface module 420 for each of the seismic receivers 115. For example, the recorder module 415 may assign pre-configured dynamic gain adjustments for each of the seismic receivers 115 and provide these assignments to the hardware interface module 420 for forwarding to the individual seismic receivers 115. As another example, the recorder module 415 may provide raw data to the hardware interface module or to the seismic receivers 115 themselves for calculating appropriate gain adjustments for each individual seismic receiver 115.

The hardware interface module 420 may be configured to receive gain adjustment information from the recorder module 415 and pass this gain adjustment information to each of the seismic receivers 115 and/or program the seismic receivers 115 accordingly. For example, the hardware interface module 420 may send signals to each of the seismic receivers 115 with information about the timing at which and the amplitudes by which each seismic receiver 115 should adjust its gain in some embodiments. The seismic receivers 115 may in some embodiments be configured to provide position information to the hardware interface module 420 and/or to the recorder module 415 for use in determining when and by what amplitude each seismic receiver 115 should adjust its gain. In other embodiments, the seismic receivers 115 may merely receive seismic source 130 timing and positioning information, and may locally combine that information with their own positioning information to determine appropriate gain adjustments.

The data buffer module 425 may be configured to continuously receive and buffer seismic data from the recorder module 415 and the seismic receivers 115, and provide this data to the shot processor module 430, which may be configured to generate traces corresponding with the seismic measurements made by the seismic receivers 115 and store the seismic traces in the data storage 435. The system 400 in FIG. 4 may be used to adjust the gain of multiple seismic receivers 115 in real-time—i.e., during a seismic survey as one or more seismic sources 130 emit seismic energy.

It will be appreciated that the configuration of the system 400 in FIG. 4 is merely one example, and many other variations and configurations are possible. For example, in some embodiments, the message broker module 410 may be omitted, and the navigation module 405 may directly send shot time and seismic source location information to the recorder module 415, to the hardware interface module 420, or even directly to the seismic receivers 115 themselves (e.g., if the seismic receivers 115 can process such information and appropriately adjust their respective gains). Also, the gain of the seismic receivers 115 may be adjusted in any appropriate manner. For example, the gain may be adjusted at the mechanical level, at a corresponding analog-to-digital converter, or generally at any appropriate point.

Figure 5:
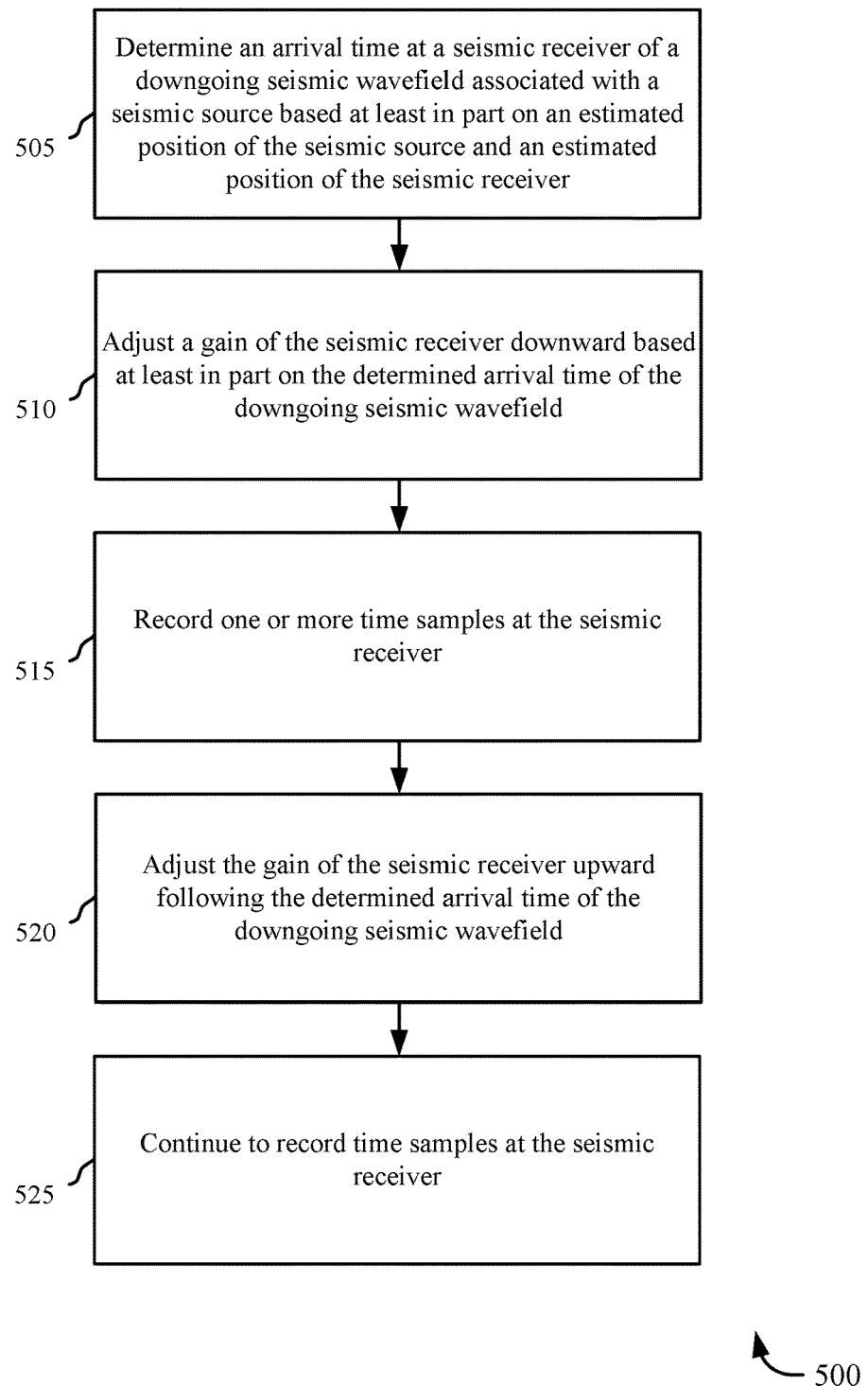
FIG. 5 is a flow chart illustrating another example of dynamically adjusting gain in a seismic survey in accordance with aspects of the present disclosure.

With reference now to FIG. 5, a flow chart is shown illustrating an example of a method 500 for dynamically adjusting gain in a seismic survey in accordance with aspects of the present disclosure. The method 500 is described with reference to the seismic data acquisition systems 100, 102 shown in FIG. 1 and more fully described with reference to the other figures herein, and may be an example of one or more aspects of the methods 200, 300 described above with reference to FIGS. 2-3. At block 505 of the method 500, an arrival time at a seismic receiver 115 of a downgoing seismic wavefield associated with a seismic source 130 may be determined based at least in part on an estimated position of the seismic source 130 and an estimated position of the seismic receiver 115. At block 510 of the method 500, a gain of the seismic receiver 115 may be adjusted downward based at least in part on the determined arrival time of the downgoing seismic wavefield. The gain of the seismic receiver 115 may be adjusted downward in order to, for example, help prevent overdriving the seismic receiver 115 by the downgoing seismic wavefield.

At block 515 of the method 500, one or more time samples from the seismic receiver 115 may be recorded (e.g., the seismic receiver 115 may transmit the seismic time samples to the hardware interface module 420, the recorder module 415, the data buffer module 425, etc. in FIG. 4. The time samples that are recorded at block 515 may be used, as explained in more detail below with reference to FIG. 9, to determine a source signature associated with the seismic source 130 and/or to recover reflection seismic data. At block 520 of the method 500, the gain of the seismic receiver 115 may be adjusted upward following the determined arrival time of the downgoing seismic wavefield (e.g., after the downgoing seismic wavefield passes the seismic receiver 115). At block 525 of the method 500, the seismic receiver 115 may continue to operate and record or transmit data samples—for example, the seismic receiver 115 may continue acquiring reflection data following the determined arrival time and passage of the downgoing seismic wavefield.

Figure 6A:
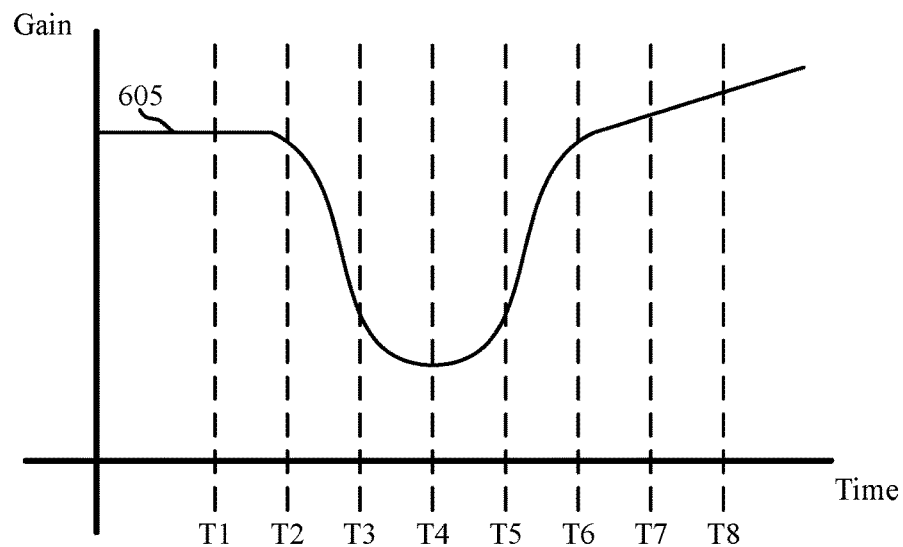
FIGS. 6A-6B are diagrams illustrating dynamic gain adjustment as a function of time in accordance with aspects of the present disclosure.

Referring now to blocks 510, 520 of the method 500 shown in FIG. 5, and also to the diagram in FIG. 6A, the gain of the seismic receiver 115 may be decreased at or before the arrival time of the downgoing seismic wavefield, and then may be increased following the arrival or complete passage of the downgoing seismic wavefield. FIG. 6A shows a plot 605 of the gain of a seismic receiver 115 with respect to time, with the times T1, T2, T3, T4, T5, T6, T7, T8 corresponding to several time samples at the seismic receiver 115 and being shown in dashed lines. At time T1 in FIG. 6A, which may correspond to a first time sample, the gain of the seismic receiver 115 is relatively high, which may correspond to the typical gain required to properly record reflected seismic wavefields. At time T2, which may correspond to a second time sample, the gain of the seismic receiver 115 is adjusted downward in connection with the arrival time determined at block 505 in FIG. 5. At time T3, which may correspond to a third time sample, the gain of the seismic receiver 115 is again adjusted downward (by a different, larger value than the adjustment at time T2). At time T4, which may correspond to a fourth time sample, the gain is again adjusted downward to its lowest level shown in FIG. 6A.

At time T5, the gain begins to be adjusted upward, and continues to be adjusted upward at time T6. As illustrated in FIG. 6A, at times T7 and T8, the gain may continue to increase above the default level from T1 in order to record reflected seismic wavefields of decreasing amplitude. In other embodiments, the gain may simply return to its default or typical value. Referring now to the adjustments at times T2, T3, T4, T5, and T6, in some embodiments, each of these adjustments may be made in connection with the determined arrival time of a downgoing seismic wavefield (such as the direct arrival of a single seismic source shot), with the subsequent arrival times having their own respective adjustments. It will be appreciated, however, that in some instances the adjustments for one downgoing seismic wavefield may overlap with adjustments for another downgoing seismic wavefield—for example, when multiple discrete sources are used (as described above), or where the source ghost closely follows the directly arriving source energy.

Referring still to FIG. 6A, the gain of the seismic receiver 115 may be adjusted at a plurality of different levels (e.g., amplitudes) for different instantaneous times. Also, while FIG. 6A shows the gain of the seismic receiver 115 increasing and decreasing in a continuous manner, in other embodiments, the gain adjustments may be discrete and non-continuous. Also, the gain may or may not remain at one particular level for any one of a plurality of different durations. For example, the gain in FIG. 6A remains relatively constant through time T1, and also remains relatively constant before and after time T4.

Referring still to FIG. 6A, time T4 may correspond with the arrival time of the downgoing seismic wavefield. In some embodiments, T4 may correspond merely with the maximum expected amplitude of the downgoing seismic wavefield—e.g., the downgoing seismic wavefield may begin to arrive at the seismic receiver 115 at time T2 or T3, increase to its maximum amplitude at time T4, and then decrease in amplitude at times T5 and T6. In these embodiments, the gain of the seismic receiver 115 may only be adjusted as much as is necessary to prevent or at least reduce the changes of overdriving of the seismic receiver 115, thus allowing the seismic receiver 115 to be as sensitive as possible. In other embodiments, however, the gain may be adjusted downward at a single level for the entire, finite duration of the downgoing seismic wavefield passing the seismic receiver 115. In these embodiments, and with reference still to FIG. 6A, the first arrival of the downgoing seismic wavefield wouldn't be until after time T3 when the gain has already been substantially reduced.

While FIG. 6A illustrates the adjustments in gain for a single seismic receiver 115, it will be appreciated that each of the plurality of seismic receivers 115 in a given system, such as the systems 100, 400 shown in FIGS. 1 and 4, may be adjusted independently of one another by different values, at different times, and/or for different durations. For example, the gains of different seismic receivers 115 may need different adjustments based on their relative distances, positions, and orientations relative to the seismic source 130. With reference back to FIG. 1E, if a first seismic receiver 115-1 is located at a first distance from and is oriented with a first orientation relative to the seismic source 130, and a second seismic receiver 115-2 is located at a second distance from and is oriented with a second orientation relative to the seismic source 130, the gains for the two seismic receivers 115-1, 115-2 may be adjusted differently in value, time, and/or duration. For example, the gain of the second seismic receiver 115-2 may be adjusted less in value (e.g., amplitude) than the amount by which the first seismic receiver 115-1 is adjusted, and/or may be adjusted later than the time at which the first seismic receiver 115-1 is adjusted. The lower amplitude for the second seismic receiver 115-2 compared to the first seismic receiver 115-1 may be a result of the different distances, orientations, or positions of the seismic receivers 115-1, 115-2. The different times at which the adjustments are made may be a result of the different propagation times to the first and second seismic receivers 115-1, 115-2 from the seismic source 130. This difference in both the values and times at which the gains of different seismic receivers are adjusted is illustrated in FIG. 6B, where the gain plots 610, 615, 620 for three different seismic sensors are illustrated.

Figure 6B:
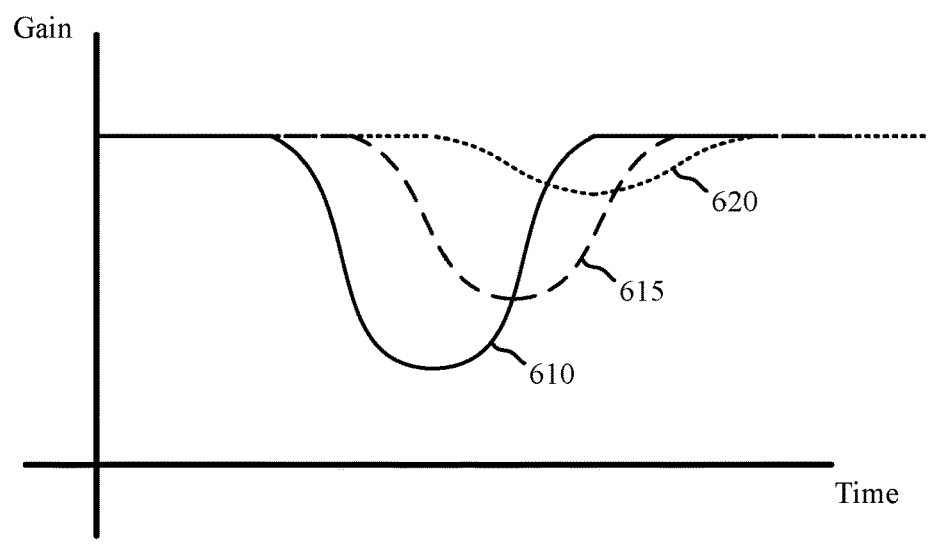

Referring now to FIGS. 6A and 6B, in some embodiments, the gain of each seismic receiver 115 may be adjusted based at least in part on an anticipated amplitude of the associated downgoing seismic wavefield—both as a function of time for a single seismic receiver 115 and amongst different seismic receivers 115. For example, as shown in FIG. 6A, the gain of a seismic receiver 115 may be adjusted downward and then upward to mirror in reverse the increasing and then decreasing amplitude of the downgoing seismic wavefield as it arrives at and then continues past the seismic receiver 115.

Figure 7A:
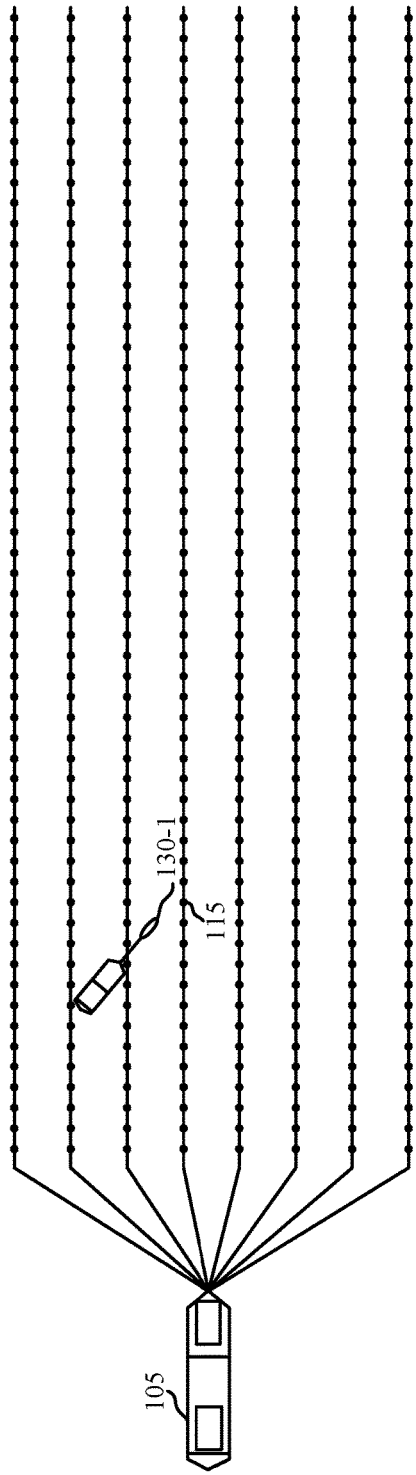
FIGS. 7A-7C are diagrams illustrating dynamic gain adjustment as a function of a characteristic associated with the seismic source in accordance with aspects of the present disclosure.
Figure 7B:
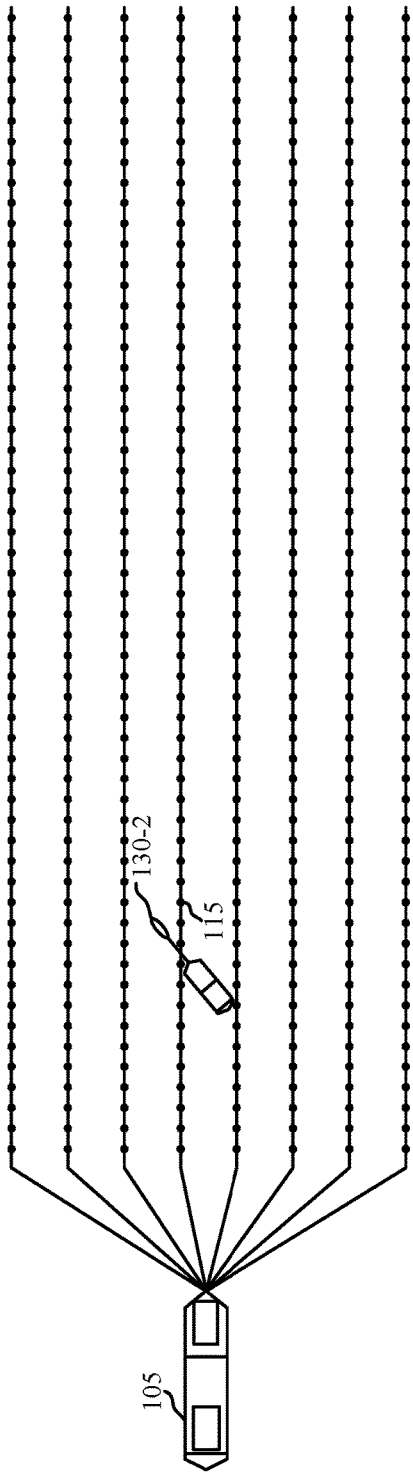

In some embodiments, the gain of seismic receiver 115 may be adjusted based at least in part on a characteristic defining the seismic source 130 and/or a characteristic of the seismic receiver 115, either of which may impact the anticipated amplitude of a seismic wavefield at the seismic receiver 115. The characteristic may be, for example, an orientation of the seismic source 130 relative to the seismic receiver 115 (or vice versa), the size of the seismic source 130, the sensitivity of the seismic receiver 115, and so forth. Taking the orientation of the seismic source 130 relative to the seismic receiver 115 as an example, FIG. 7A shows a directional seismic source 130-1 that is oriented in a first orientation relative to a seismic receiver 115, with the seismic source 130-1 "pointing towards" the seismic receiver 115. This orientation of the seismic source 130-1 relative to the seismic receiver 115 may require a greater amplitude gain adjustment in blocks 510 and 520 than in the configuration illustrated in FIG. 7B, in which the directional seismic source 130-2 is "pointed away from" the seismic receiver 115.

As another example, the gain of a seismic receiver 115 may be adjusted in blocks 510 and 520 based at least in part on the size of the seismic source 130. In both of these examples, the characteristic or characteristics defining the source may facilitate determining the anticipated amplitude of the downgoing seismic wavefield. For example, a directly propagating, downgoing seismic wavefield associated with the energy emitted by an air gun with a relatively large air volume and/or that is directly pointed towards a particular seismic receiver 115 may be expected to be much greater than an air gun with a smaller air volume and/or an air gun that is pointed away from a particular seismic receiver 115.

In addition to using information on the size and relative orientation of the seismic source 130 relative to the seismic receiver 115, there are several other sources of information that may be used to estimate the anticipated amplitude of the downgoing seismic wavefield from a seismic source 130 at a seismic receiver 115. For example, the anticipated amplitude may be estimated based at least in part on one or more measurements from a previous field test of the seismic source 130 conducted to characterize the energy emitted by the seismic source 130. As still another alternative or additional source of information that may be used to help determine the anticipated amplitude of the downgoing seismic wavefield, a modeling procedure may be used. For example, a directionally varying source signature of the seismic source 130 may be modeled, and the results of this model, together with the known information about the positions and orientations of the seismic source 130 and the seismic receivers 115, may be used to estimate the amplitude of the downgoing seismic wavefield associated with seismic energy emitted from the seismic source 130 at the seismic receivers 115.

Figure 7C:
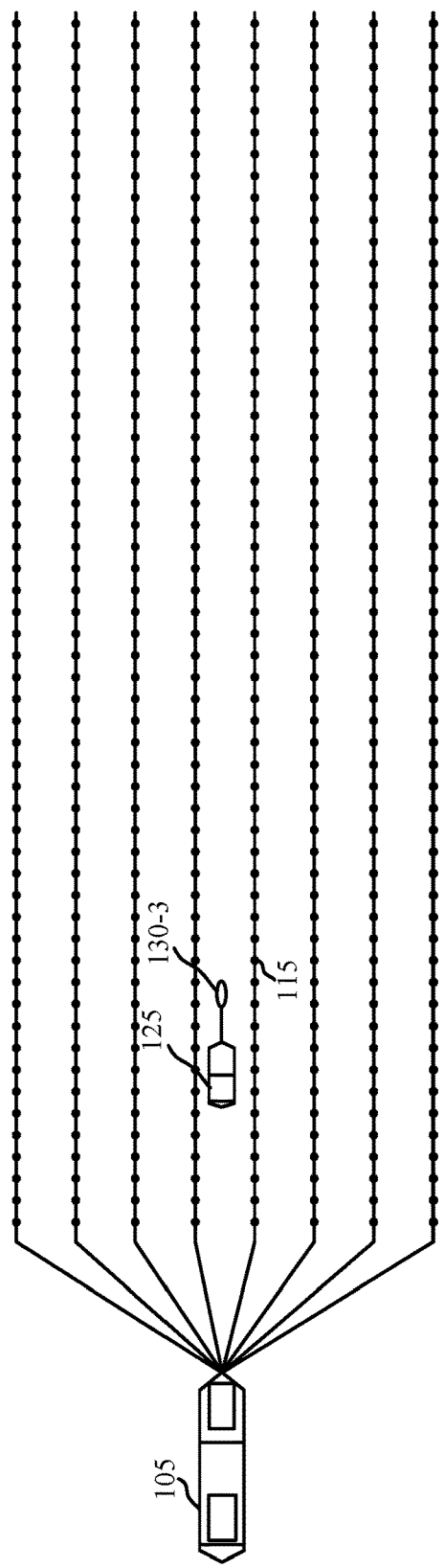

As another example, FIG. 7C shows a seismic source 130-3 towed by an independent source vessel 125 that is moving at a same speed and in a same orientation as acquisition vessel 105. In such an embodiment, where the position of the seismic source 130-3 is constant relative to the seismic receivers 115, the amplitude gain adjustment of the seismic receivers 115 may be preconfigured. In one example, seismic receivers 115 that are closest to the seismic source 130-3 may be preconfigured with a constant lower gain setting relative to the seismic receivers 115 that are further from the seismic source 130-3. In another example, the seismic receivers 115 that are closest to the seismic source 130-3 may be preconfigured to dynamically adjust their gain settings based on a known timing of source shorts from the seismic source 130-3 and a depth of the seismic receivers 115. Seismic receivers 115 that are further away from the seismic source 130-3 may be preconfigured to dynamically adjust their gain at to a lesser degree based on their distance from the seismic source 130-3.

Figure 8:
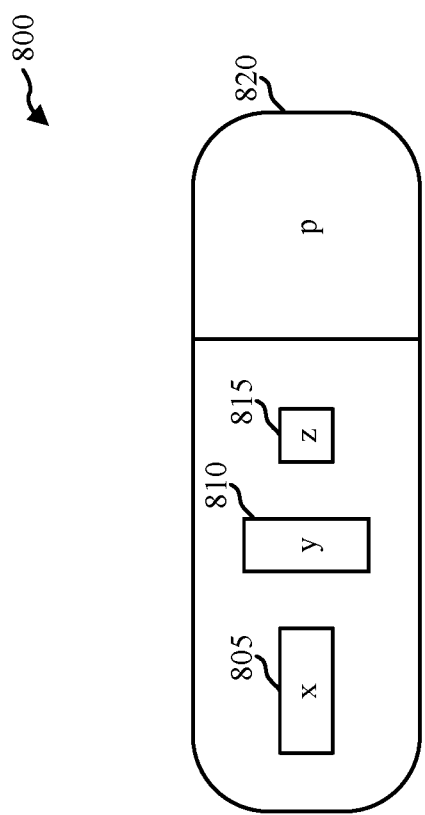
FIG. 8 is a diagram of one example of a seismic receiver for use in marine seismic surveys in accordance with aspects of the present disclosure.

FIG. 8 is a diagram of one example of a seismic receiver 115 in accordance with aspects of the present disclosure. The seismic receiver 115 in FIG. 8 includes one or more sensors 805, 810, 815, 820 configured to record a respective plurality of components of a seismic wavefield. The seismic receiver in FIG. 8 includes three particle motion sensors 805, 810, 815 (corresponding to the three Cartesian axes x, y, and z, respectively), and a pressure sensor 820. Each of these sensors may be associated with one component of a seismic wavefield—the particle motion sensors 805, 810, 815 (e.g., geophones or accelerometers) being associated with the vectorial velocity or acceleration components of the seismic wavefield and the pressure sensor 820 (e.g., a hydrophone) being associated with the scalar pressure component of the seismic wavefield. Each of the sensors may also be associated with a respective channel gain, and the channel gains associated with each sensor in the seismic receiver 115 may be adjusted independently of one another. For example, if the vectorial motion component of a particular downgoing seismic wavefield will primarily overdrive the z-component particle motion sensor 815 and the pressure sensor 820, the respective channel gains associated with the z-component particle motion sensor 815 and the pressure sensor 820 may be substantially adjusted downward in conjunction with the arrival of the downgoing seismic wavefield, while the respective channel gains associated with the x- and y-component particle motion sensors 805, 810 may be adjusted by a lesser amplitude or not at all.

Figure 9:
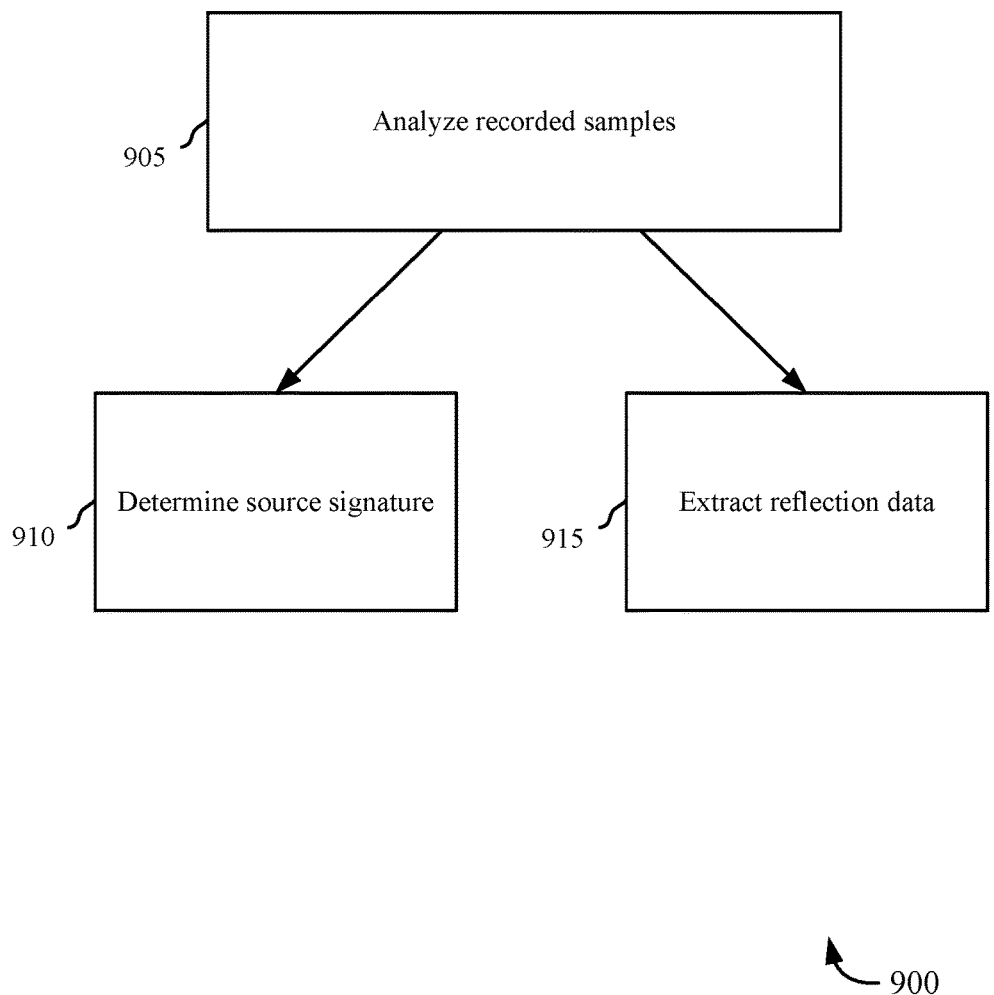
FIG. 9 is a flow chart illustrating data processing operations in accordance with aspects of the present disclosure

FIG. 9 is a flow chart illustrating a data processing method 900 that may be carried out during the course of or following a seismic survey in accordance with aspects of the present disclosure. The method 900 is described with reference to the seismic data acquisition systems 100, 102 shown in FIG. 1 and more fully described with reference to the other figures herein. At block 905 of the method 900, recorded samples (e.g., time samples) are analyzed by a data processor. As known in the art, such analysis and processing may include pre-processing activities as denoising, multiple and ghost removal, and so forth. At block 910 of the method 900, a source signature may be determined using the recorded samples, and/or at block 915 of the method 900, reflection data may be extracted from the recorded samples. As explained above, some of the samples recorded by seismic receivers 115 may correspond to a downgoing seismic wavefield (e.g., the directly propagating energy emitted by one or more seismic sources 130), and these data samples may be used for one or both purposes outlined in blocks 910 or 915. Determining a source signature and/or extracting reflection data may be made possible as a result of gain adjustments that were made during the acquisition of the seismic data to help prevent overdriving of the seismic receivers 115, as explained in more detail above. With reference to FIG. 9, however, each recorded time sample corresponding to a downgoing seismic wavefield may be used to determine a source signature associated with the seismic source 130, extract reflection data, or both, or neither.

Figure 10:
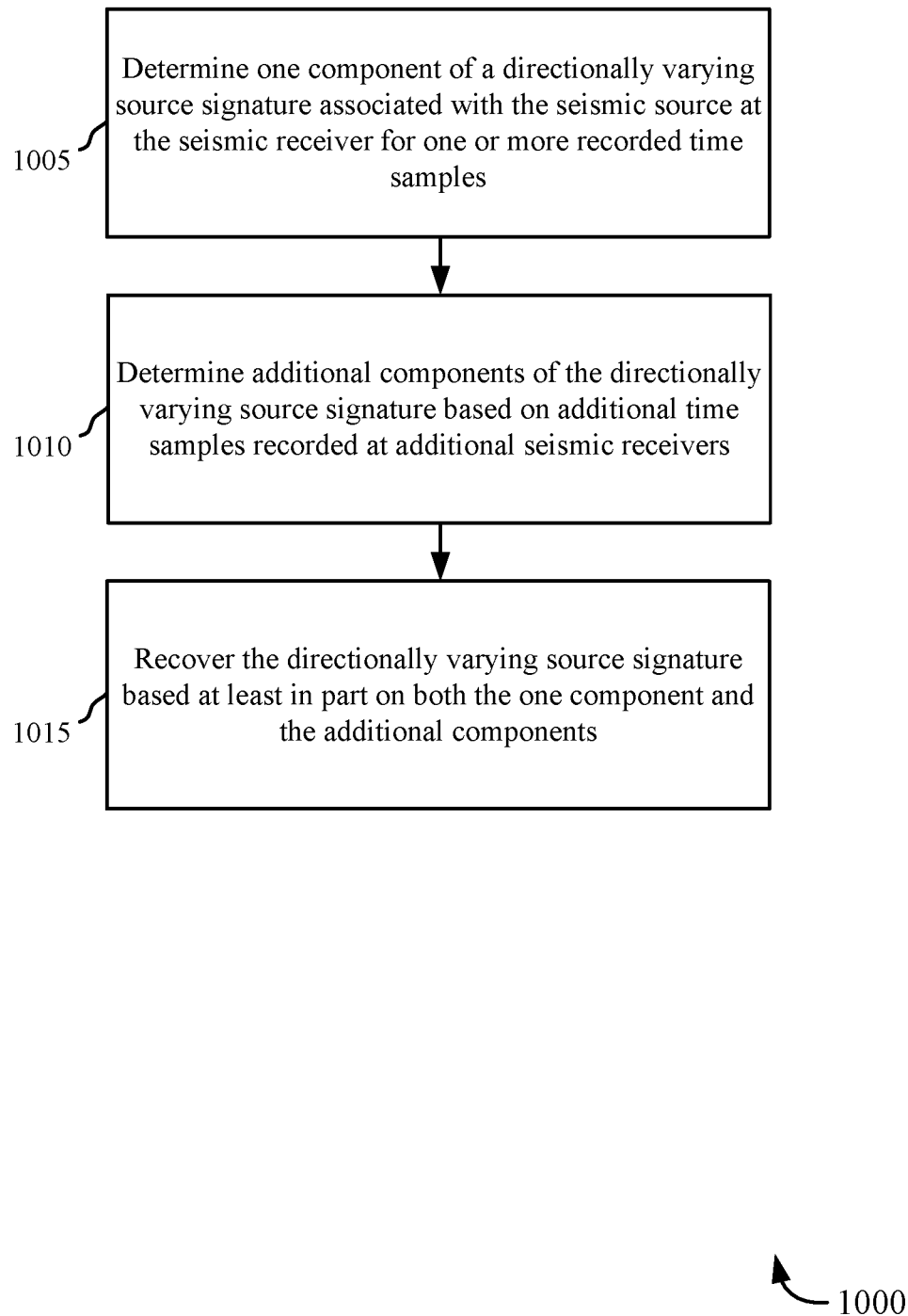
FIG. 10 is a flow chart illustrating a method for recovering a directionally varying source signature in accordance with aspects of the present disclosure.

Turning now to FIG. 10, a flow chart is shown illustrating a method 1000 for recovering a directionally varying source signature in accordance with aspects of the present disclosure. The method 1000 is described with reference to the seismic data acquisition systems 100, 102 shown in FIG. 1 and more fully described with reference to the other figures herein, and may be an example of one or more aspects of block 910 of the method 900 described above with reference to FIG. 900. As mentioned above with reference to FIG. 1E, each seismic receiver 115-1, 115-2 in a seismic acquisition system may be able to record time samples of a downgoing seismic wavefield, such as the directly arriving seismic energy emitted from a seismic source 130. Because each receiver 115-1, 115-2 is oriented and positioned differently with respect to the seismic source 130, and because the seismic source 130 may have a directionally varying source signature, each receiver 115-1, 115-2 may only record one component of the full source signature that characterizes the seismic source 130. In other words, the time samples from each seismic receiver 115-1, 115-2 may be used to determine respective components of the full, directionally varying source signature associated with the seismic source 130, with each component of the directionally varying source signature being characterized by one or more of an orientation of the seismic source 130 relative to the respective seismic receiver 115, an azimuthal angle from an inline axis of the seismic source 130 relative to the respective seismic receiver 115, and/or a vertical angle of the seismic source 130 relative to the respective seismic receiver 115. Accordingly, FIG. 10 illustrates a method 1000 by which many or all components of a directionally varying source signature can be recovered using seismic data time samples recorded at each of a plurality of seismic receivers 115.

At block 1005 of the method 1000, one component of a directionally varying source signature associated with the seismic source 130 at a first seismic receiver 115-1 for one or more recorded time samples is determined. At block 1010 of the method 1000, additional components of the directionally varying source signature are determined based on additional recorded time samples recorded at additional seismic receivers 115-2. At block 1015 of the method 1000, the directionally varying source signature may be recovered based on all of the components determined in blocks 1005 and 1010—for example, the individual components may be combined to represent the directionally varying source signature.

Referring now to the methods 200, 300, 500, 900, 1000 illustrated in FIGS. 2, 3, 5, 9, and 10, the various operations may be rearranged or otherwise modified such that other implementations are possible. Also, in some examples, one or more aspects from one or more of the methods 200, 300, 500, 900, 1000 illustrated in FIGS. 2, 3, 5, 9, and 10 may be combined with one or more of the other methods or other aspects of the same respective method, such that many different combinations of the acts and operations described herein are possible and expressly contemplated.

Referring again to the methods 200, 300, 500, 900, 1000 illustrated in FIGS. 2, 3, 5, 9, and 10, it will be appreciated that different entities may perform different aspects of the present disclosure. It will thus be understood that some aspects of conducting a seismic survey and/or the subsequent data processing as described herein may be performed by one entity with the intent of having one or more other, separate entities perform one or more other aspects of the seismic survey or data processing. In other examples, however, a single entity may perform multiple aspects or even all of the aspects of the present disclosure.

Figure 11:
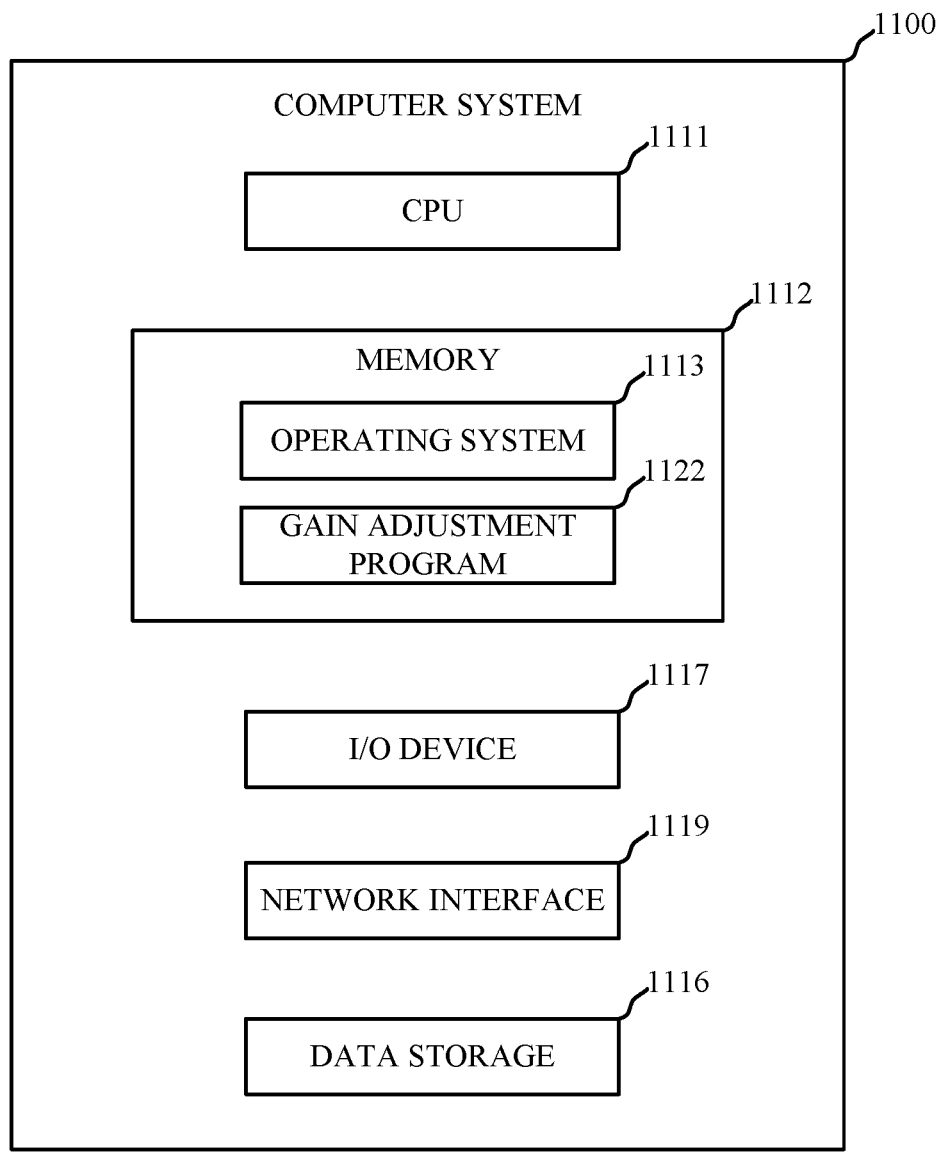
FIG. 11 is a diagram illustrating an example of a computer processing system that may be used in a seismic survey system in accordance with aspects of the present disclosure.

FIG. 11 illustrates an exemplary computer system 1100, which may be used to perform one or more of the operations in the various methods described herein. As illustrated in FIG. 11, the computer system 1100 may include at least one Central Processing Unit (CPU) 1111, a memory 1112, a data storage 1116, an input/output device 1117, and a network interface device 1119. While a single CPU 1111 is shown in FIG. 11, in alternative embodiments, a plurality of CPUs may be implemented within the computer system, or multiple computer systems may be combined as a processing cluster.

The input/output device 1117 may include devices such as a mouse, keyboard, trackball, stylus pen, touchscreen, display (e.g., computer monitor), and the like. The network interface device 1119 may be any entry/exit device configured to allow network communications between the computer system 1100 and another device, e.g., another computer system, a server, and the like. In one embodiment, the network interface device 1119 may be a network adapter or other network interface card (NIC).

Data storage 1116 may be a Direct Access Storage Device (DASD). Although it is shown as a single unit, it could be a combination of fixed and/or removable storage devices, such as fixed disc drives, floppy disc drives, tape drives, removable memory cards, or optical storage. The memory 1112 and data storage 1116 could be part of one virtual address space spanning multiple primary and secondary storage devices.

The memory 1112 may be a random access memory that is sufficiently large to hold the necessary programming and data structures of the present disclosure. While memory 1112 is shown as a single entity, it should be understood that memory 1112 may in fact comprise a plurality of modules, and that memory 1112 may exist at multiple levels, from high speed registers and caches to lower speed but larger dynamic random access memory (DRAM) chips. The memory 1112 may include an operating system 1113. Any operating system supporting the functions disclosed herein may be used.

Memory 1112 may also include a gain adjustment program 1122 which, when executed by CPU 1111, enables the dynamic adjustment of the gain of one or more seismic receivers based on a determined arrival time of a downgoing seismic wavefield as described above. Generally speaking, the memory 1112 may include one or more programs configured to provide the features described herein.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments. Further, all relative and directional references used herein are given by way of example to aid the reader's understanding of the particular embodiments described herein. They should not be read to be requirements or limitations, particularly as to the position, orientation, or use of the invention unless specifically set forth in the claims.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a wireless network. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the computer into a machine-readable format and hence executable instructions. Also, programs are comprised of variables and data structures that either reside locally to the program or are found in memory or on storage devices.

What is claimed is:

1. A method for acquiring a seismic survey, comprising:
   determining an arrival time at a seismic receiver of a downgoing seismic wavefield associated with a seismic source based at least in part on an estimated position of the seismic source, an estimated position of the seismic receiver, or combinations thereof; and
   adjusting a gain of the seismic receiver based at least in part on the determined arrival time of the downgoing seismic wavefield, wherein adjusting the gain comprises:
      decreasing the gain relative to a first gain level at a time before the determined arrival time of the downgoing seismic wavefield; and
      increasing the gain to a second gain level following the arrival of the downgoing seismic wavefield, the second gain level being higher than the first gain level.

2. The method of claim 1, further comprising determining the estimated position of the seismic source based at least in part on one or both of a known position of the seismic source or a predicted position of the seismic source.

3. The method of claim 2, further comprising deriving the predicted position of the seismic source based at least in part on a speed and a direction of a vessel towing the seismic source.

4. The method of claim 1, further comprising determining the estimated position of the seismic source based on audio measurements of sounds emanating from a vessel towing the seismic source.

5. The method of claim 1, further comprising determining the estimated position of the seismic receiver based at least in part on one or both of a known position of the seismic receiver or a predicted position of the seismic receiver.

6. The method of claim 5, further comprising deriving the predicted position of the seismic receiver based at least in part on a speed and a direction of a vessel towing the seismic receiver.

7. The method of claim 1, wherein the gain of the seismic receiver is adjusted downward to help prevent overdriving the seismic receiver by the downgoing seismic wavefield.

8. The method of claim 1, wherein the downgoing seismic wavefield corresponds with directly propagating seismic energy emitted by the seismic source.

9. The method of claim 1, wherein the downgoing seismic wavefield includes a source ghost.

10. The method of claim 1, further comprising:
    recording one or more time samples at the seismic receiver following said adjusting of the gain; and
    determining a source signature associated with the seismic source at the seismic receiver for the one or more recorded time samples, the determined source signature representing one component of a directionally varying source signature.

11. The method of claim 10, wherein the one component of the directionally varying source signature represented by the determined seismic source signature is characterized by one or more of an orientation of the seismic source relative to the seismic receiver, an azimuthal angle from an inline axis of the seismic source relative to the seismic receiver, and a vertical angle of the seismic source relative to the seismic receiver.

12. The method of claim 10, further comprising determining additional components of the directionally varying source signature based at least in part on additional time samples recorded at additional seismic receivers.

13. The method of claim 12, further comprising recovering the directionally varying source signature based at least in part on said one component and said additional components of the directionally varying source signature.

14. The method of claim 10, further comprising:
    extracting reflection data from the one or more recorded time samples.

15. The method of claim 1, further comprising:
    acquiring reflection data at the seismic receiver following the determined arrival time.

16. The method of claim 1, wherein the seismic receiver is vertically or laterally displaced below the seismic source.

17. The method of claim 1, wherein the seismic receiver is located on a seafloor below the seismic source.

18. The method of claim 1, wherein the seismic source is towed by a source vessel that is independent from the seismic receiver.

19. The method of claim 18, wherein the seismic receiver comprises one or more sensors coupled to a streamer towed by an acquisition vessel that is towed independently from the source vessel.

20. The method of claim 18, wherein the seismic receiver comprises one or more sensors in an ocean-bottom cable or an ocean-bottom node.

21. The method of claim 1, wherein the arrival time is a first arrival time, the seismic receiver is a first seismic receiver, and the gain of the first seismic receiver is adjusted by a first value for a first recorded sample, further comprising:
    determining, at a second seismic receiver, a second arrival time of the downgoing seismic wavefield based at least in part on the estimated position of the seismic source and an estimated position of the second seismic receiver, the second seismic receiver being offset from the first seismic receiver; and
    adjusting a gain of the second seismic receiver by a second value for a second recorded sample based at least in part on the determined second arrival time.

22. The method of claim 21, wherein the first and second values are different, the first and second recorded samples correspond to different absolute times, or both the first and second values are different and the first and second recorded samples correspond to different absolute times.

23. The method of claim 1, wherein the seismic receiver is one of a plurality of seismic receivers, and respective gains of others of the plurality of receivers are adjusted independently by one of a plurality of values.

24. The method of claim 1, wherein the arrival time is a first arrival time, and the gain of the seismic receiver is adjusted by a first value for a first recorded sample in connection with the first arrival time, further comprising:
adjusting the gain of the seismic receiver by a second value for a second recorded sample.

25. The method of claim 24, wherein the gain of the seismic receiver is adjusted by the second value for the second recorded sample based at least in part on the estimated position of the seismic source and the estimated position of the seismic receiver in connection with the first arrival time.

26. The method of claim 1, wherein the estimated position of the seismic source includes a three dimensional location and time at which the seismic source emits seismic energy and the estimated position of the seismic receiver includes a three dimensional location and the arrival time at which the seismic receiver is anticipated to record measurements associated with the downgoing seismic wavefield.

27. The method of claim 1, wherein the gain of the seismic receiver is adjustable at a plurality of different gain levels and for a plurality of different durations.

28. The method of claim 1, further comprising adjusting the gain of the seismic receiver based at least in part on a characteristic defining the seismic source.

29. The method of claim 28, wherein the characteristic comprises an orientation of the seismic source relative to the seismic receiver.

30. The method of claim 1, wherein the adjusting of the gain is done in real-time with respect to the seismic source emitting seismic energy corresponding to the downgoing seismic wavefield.

31. The method of claim 1, further comprising adjusting the gain of the seismic receiver based at least in part on an anticipated amplitude of the downgoing seismic wavefield.

32. The method of claim 31, wherein the anticipated amplitude of the downgoing seismic wavefield is estimated based at least in part on measurements characterizing the seismic source from a previous field test or predictions based on a characteristic defining the seismic source.

33. The method of claim 31, wherein the anticipated amplitude of the downgoing seismic wavefield is estimated based at least in part on modeling a directionally varying source signature of the seismic source.

34. The method of claim 1, wherein the seismic receiver comprises a plurality of sensors configured to record a respective plurality of components of the downgoing seismic wavefield, and a first channel gain associated with a first of the plurality of components of the downgoing seismic wavefield is adjusted differently than a second channel gain associated with a second of the plurality of components of the downgoing seismic wavefield.

35. A seismic data acquisition system, comprising:
means for determining an arrival time at a seismic receiver of a downgoing seismic wavefield associated with a seismic source based at least in part on an estimated position of the seismic source, an estimated position of the seismic receiver, or combinations thereof; and
means for adjusting a gain of the seismic receiver based at least in part on the determined arrival time of the downgoing seismic wavefield, wherein the means for adjusting the gain comprises:
means for decreasing the gain relative to a first gain level at a time before the determined arrival time of the downgoing seismic wavefield; and
means for increasing the gain to a second gain level following the arrival of the downgoing seismic wavefield, the second gain level being higher than the first gain level.

36. A seismic data acquisition system, comprising:
an acquisition vessel configured to tow a seismic streamer including a seismic receiver; and
a seismic source configured to emit seismic energy;
wherein a gain of the seismic receiver is dynamically adjustable based at least in part on a determined arrival time of a downgoing seismic wavefield associated with the seismic energy emitted by the seismic source,
wherein the gain is decreased relative to a first gain level at a time before the determined arrival time of the downgoing seismic wavefield, and the gain is increased to a second gain level following the arrival of the downgoing seismic wavefield, the second gain level being higher than the first gain level.

37. The system of claim 36, wherein the determined arrival time is determined based at least in part on an estimated position of the seismic source as it emits the seismic energy and is also determined based at least in part on an estimated position of the seismic receiver as it is anticipated to sense the emitted seismic energy as the downgoing seismic wavefield.

38. A method for acquiring a seismic survey, comprising:
operating a seismic receiver during operation of a seismic source transmitting a downgoing seismic wavefield, a position of the seismic source being constant during operation relative to the seismic receiver;
determining an arrival time at the seismic receiver of the downgoing seismic wavefield; and
using a gain at the seismic receiver based at least in part on a proximity of the seismic receiver to the seismic source,
wherein the gain is decreased relative to a first gain level at a time before the determined arrival time of the downgoing seismic wavefield and the gain is increased to a second gain level following the arrival of the downgoing seismic wavefield, the second gain level being higher than the first gain level.

39. The method of claim 38, further comprising:
adjusting the gain of the seismic receiver based at least in part on the determined arrival time of the downgoing seismic wavefield.

40. The method of claim 39, wherein determining the arrival time at the seismic receiver comprises:
determining the arrival time in advance based on the position of the seismic source relative to the seismic receiver.

41. The method of claim 40, further comprising:
preconfiguring the seismic receiver to adjust the gain of the seismic receiver based on a known shot timing of the seismic source.

42. The method of claim 38, wherein the gain at the seismic receiver is constant and is lower than a gain at other seismic receivers that are further away from the seismic source than the seismic receiver.

* * * * *